United States Patent
Machino

(10) Patent No.: US 7,433,780 B2
(45) Date of Patent: Oct. 7, 2008

(54) ROUTE SEARCHING APPARATUS

(75) Inventor: Hiroshi Machino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/773,181

(22) Filed: Feb. 9, 2004

(65) Prior Publication Data

US 2005/0055158 A1 Mar. 10, 2005

(30) Foreign Application Priority Data

Sep. 4, 2003 (JP) .............................. 2003-312954

(51) Int. Cl.
*G01C 21/00* (2006.01)

(52) U.S. Cl. ........................ 701/202; 701/206; 701/209; 340/995.19

(58) Field of Classification Search ........................ None
See application file for complete search history.

(56) References Cited

U.S. PATENT DOCUMENTS

| | | | |
|---|---|---|---|
| 6,192,314 B1 * | 2/2001 | Khavakh et al. | 701/209 |
| 6,295,503 B1 * | 9/2001 | Inoue et al. | 701/209 |
| 6,470,266 B1 * | 10/2002 | Ito et al. | 701/209 |
| RE38,724 E * | 4/2005 | Peterson | 701/209 |
| 2001/0021895 A1 * | 9/2001 | Yamazaki | 701/211 |

FOREIGN PATENT DOCUMENTS

| | | |
|---|---|---|
| JP | 11-271081 | 5/1999 |
| JP | 2000-131085 A | 5/2000 |
| JP | 2001-183159 A | 7/2001 |
| JP | 2005-061988 | 10/2005 |

* cited by examiner

*Primary Examiner*—Khoi H. Tran
*Assistant Examiner*—Marie A Weiskopf
(74) *Attorney, Agent, or Firm*—Birch, Stewart, Kolasch & Birch, LLP

(57) ABSTRACT

A route searching apparatus includes a map data acquiring unit for acquiring map data defined by nodes and road links, a route searching unit for searching for a route to a destination in consideration of road links corresponding to specific roads, on which determination of whether or not a vehicle is allowed to travel can be performed according to a condition of the vehicle before the condition of the vehicle is set, the road links being included in the map data acquired by the map data acquiring unit, and an output unit for outputting the route searched for by the route searching unit.

2 Claims, 5 Drawing Sheets

ROUTE SEARCHING APPARATUS

This Non-provisional application claims priority under 35 U.S.C. § 119(a) on Patent Application No(s). 2003-312954 filed in Japan on Sep. 4, 2003, the entire contents of which are hereby incorporated by reference.

BACKGROUND OF THE INVENTION

1. Field of the Invention

The present invention relates to a route searching apparatus for searching for a route to a destination from the current position of a vehicle. Particularly, it relates to a route searching apparatus that facilitates a process of performing route searching.

2. Description of Related Art

Conventionally, in a navigation system that detects the current position of a vehicle and displays a mark indicating the current position on a roadmap displayed on a display screen, a route searching apparatus for searching for an appropriate route from the current position of the vehicle to a destination is used. This route searching apparatus calculates a cost required for each road link to be searched for that exists between the current position of the vehicle and the destination by using road link information provided to each road link between nodes. When the route searching apparatus then finishes calculating the cost required for each of all road links to be searched for, the route searching apparatus selects road links from among all the road links so that the total cost is minimized and connects them with one another so as to determine the appropriate route to the destination.

In this case, because the route searching apparatus acquires, as the appropriate route, a series of the selected road links that are connected with one another, the series of the connected road links extending from the current position to the destination, the route searching apparatus cannot adopt, as part of the route, road links corresponding to restricted roads where vehicles are not allowed to enter, such as road links corresponding to one-way roads or pedestrian roads. Therefore, when determining that all the road links to be searched for include one or more restricted road links based on information about connection between road links, the route searching apparatus performs route searching while excluding the one or more restricted road links.

By the way, such restricted roads where vehicles are not allowed to enter include not only roads where restrictions are placed on all vehicles but also roads where restrictions are limitedly placed on specific vehicles according to conditions of the vehicles. For example, car pool lanes employed by a road system mainly seen in a large city of North America are roads where restrictions are limitedly placed on specific vehicles according to conditions of the vehicles. Car pool lanes are lanes where only vehicles in which two or more occupants are riding together are allowed to travel, for example. A lane additionally disposed in a highway, a lane that is a shortcut disposed in an interchange, and so on are known as car pool lanes. A road system that employs car pool lanes gives people preferential treatment of making it possible for people to arrive at the destination in a short time if traveling in a car pool lane so as to encourage people to ride together in one vehicle and to decrease the whole traffic to reduce traffic congestion.

Most of prior art route searching apparatus don't use car pool lane information when performing route searching because the condition of a vehicle change according to the number of occupants riding together in the vehicle. In this case, prior art route searching apparatus assume that car pool lanes are restricted lanes where all vehicles are not allowed to travel, or intentionally set the cost of car pool lanes, which is used for the route determination, to very high so as to substantially exclude car pool lanes from targets of the route determination. Therefore, even if a searched-for route including one or more car pool lanes is a shortcut, the route is not acquired as the searching result.

As previously explained, prior art route searching takes only information about roads (i.e., road link information, connection information about connection between road links, etc.) into consideration, but doesn't take information about vehicles that travel on roads into consideration. In recent years, route searching apparatus for performing route searching in consideration of information about vehicles that travel on roads in order to support road systems provided with car pool lanes have been developed.

For example, Japanese patent application publication (TOKKAI) No. 2000-131085 discloses a route setting device and a navigation apparatus that can implement more appropriate route setting in order to support cases where whether or not a vehicle is allowed to travel is determined according to the circumstances of the vehicle. The route setting device and the navigation apparatus set a route to the destination in consideration of vehicle-associated information. For example, while the route setting device and the navigation apparatus assume that when one occupant or less is riding in the vehicle, the vehicle is not allowed to travel in car pool lanes, and then excludes car pool lanes from targets of the route determination, the route setting device and the navigation apparatus deal with car pool lanes in the same way as dealing with other roads and assume car pool lanes to be targets of the route determination when two or more occupants are riding together in the vehicle. Therefore, when two or more occupants are riding together in the vehicle, there is a possibility that an advantageous route to the destination is set as compared with the case where one occupant or less is riding in the vehicle. In other words, because car pool lanes often provide an advantage, such as a shorter approach to an exit of a highway or the like or a shorter distance over which the vehicle will travel in a highway or the like, for people riding together, unlike general lanes, it can be expected that a more appropriate route to the destination including one or more car pool lanes is provided.

Japanese patent application publication (TOKKAI) No. 2001-183159 discloses a navigation apparatus that enables a target vehicle to effectively travel in a specific lane which vehicles are limitedly allowed to enter or leave. The navigation apparatus reads map data including road information about enter/exit points of highways provided with car pool lanes from a DVD, and then stores the map data in a data buffer. The navigation apparatus has a route searching process unit that performs a route searching process by using the map data stored in the data buffer in consideration of whether or not the target vehicle is allowed to travel car pool lanes. When performing a route guidance using car pool lanes, a car pool lane guidance unit of the navigation apparatus provides guidance for instructing a lane change by using an image and a voice at timing when the vehicle reaches at a predetermined distance or less from an enter/exit point where the vehicle should change to another lane.

In the prior art technology disclosed in above-mentioned Japanese patent application publication (TOKKAI) No. 2000-131085 and Japanese patent application publication (TOKKAI) No. 2001-183159, the user sets information about the vehicle to the road searching apparatus in advance so that the road searching apparatus can perform route searching in consideration of the set information about the vehicle. Therefore, the user has an inconvenience of having to set a condition of the vehicle in advance regardless of knowing if such a road as a car pool lane on which determination of whether or not vehicles are allowed to travel can be performed according to the condition of the vehicle is included in the searched-for route from the current position to the destination.

Furthermore, in such a system in which whether or not vehicles are allowed to travel is determined according to the number of occupants riding together as a road system provided with car pool lanes, because the condition of a vehicle changes every time when the vehicle is driven and every time when one or more occupants get on or off, the user has an inconvenience of having to reset the condition of the vehicle on an as-needed basis.

In addition, because the user needs to set various conditions associated with the vehicle, a setting screen that allows the user to set various conditions to the route searching apparatus contains a lot of screens, and therefore the user needs to perform operations until a desired screen is provided. The route searching apparatus can be so constructed as to automatically detect and set a condition of the vehicle, such as the number of occupants riding together in the vehicle. A problem is however that the route searching apparatus needs a sensor or the like for automatically detecting the number of occupants riding together in the vehicle, and therefore increases in cost.

SUMMARY OF THE INVENTION

The present invention is proposed to solve the above-mentioned problems, and it is therefore an object of the present invention to provide a route searching apparatus that can perform route searching by taking a condition of a vehicle into consideration in response to a user's simple operation.

In order to achieve the above-mentioned object, a route searching apparatus in accordance with the present invention is provided with a map data acquiring unit for acquiring map data defined by nodes and road links, a route searching unit for searching for a route to a destination in consideration of road links corresponding to specific roads, on which determination of whether or not a vehicle is allowed to travel can be performed according to a condition of the vehicle, before the condition of the vehicle is set, the road links being included in the map data acquired by the map data acquiring unit, and an output unit for outputting the route searched for by the route searching unit.

In accordance with the present invention, before the condition of the vehicle is set, the route searching apparatus searches for a route to the destination by taking road links corresponding to specific roads into consideration. In other words, the user need not set the condition of the vehicle when the route searching apparatus searches for the route to the destination by taking road links corresponding to specific roads into consideration. "Taking road links corresponding to specific roads into consideration" includes counting road links corresponding to specific roads as targets to be searched for and recognition of the existence of road links corresponding to specific roads without counting the road links as targets to be searched for. As a result, because the user need not perform the inconvenient setting of the condition of the vehicle in advance, and only has to set it if necessary, the route searching apparatus can perform route searching by taking the condition of the vehicle into consideration in response to the user's simple operation.

Further objects and advantages of the present invention will be apparent from the following description of the preferred embodiments of the invention as illustrated in the accompanying drawings.

DETAILED DESCRIPTION OF THE PREFERRED EMBODIMENTS

The preferred embodiments of the invention will now be described with reference to the accompanying drawings. In the following, the invention will be explained by taking car pool lanes which are employed by some road systems in the United States as an example of specific roads on which determination of whether or not a target vehicle is allowed to travel is performed according to a condition established for the vehicle. For example, a lane as shown in FIG. 5, which is disposed in addition to general lanes of a highway, and a road as shown in FIG. 6, which is independently disposed in an interchange as a special-purpose road, are known as car pool lanes.

Figure 5:
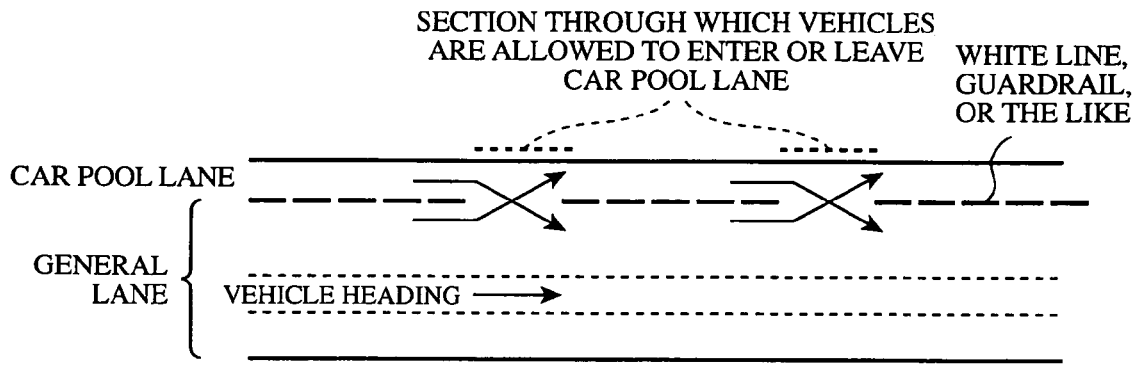
FIG. 5 is a diagram for explaining a car pool lane disposed in addition to general lanes of a highway.

The car pool lane as shown in FIG. 5 is partitioned from general lanes by a white line, guardrail, or the like. The white line, guardrail, or the like includes sections in which vehicles are allowed to enter and leave the car pool lane are arranged at predetermined intervals. In this case, while a vehicle in which only a driver is riding cannot avoid traffic congestion that occasionally occurs because the vehicle has to travel in a general lane, a vehicle in which two or more occupants are riding together can travel comfortably even though traffic congestion occurs in general lanes because the vehicle can travel in the car pool lane.

Figure 6:
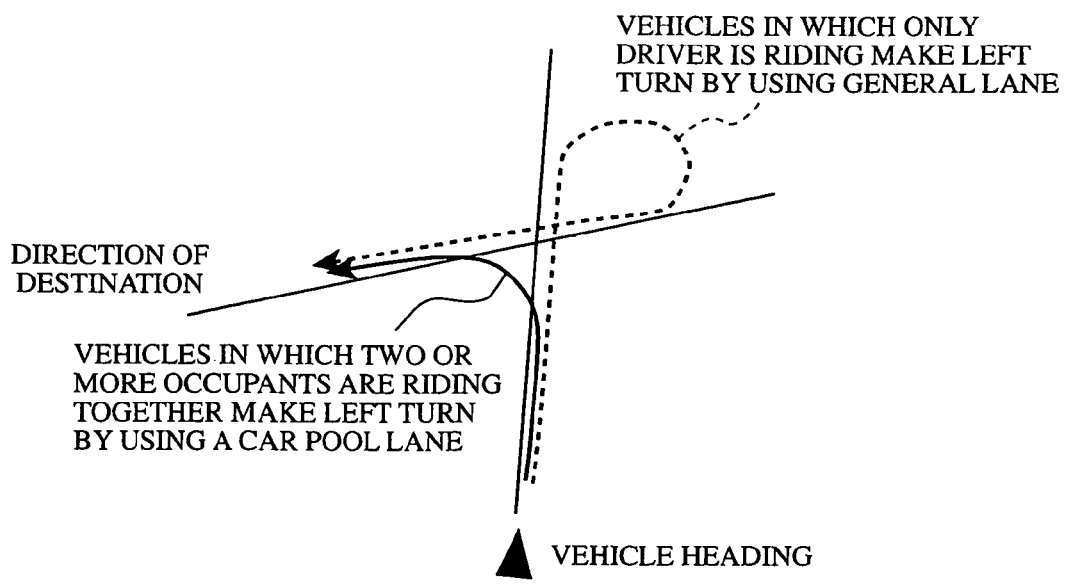
FIG. 6 is a diagram for explaining a car pool lane independently disposed in an interchange as a special-purpose lane.

The car pool lane as shown in FIG. 6 is a special-purpose road intended for vehicles to take a shortcut in an interchange. In this case, while a vehicle in which only a driver is riding takes a lot of time to travel a large distance when making a left turn because the vehicle has to travel in a general lane designated by a dotted line, a vehicle in which two or more occupants are riding together can make a left turn after traveling a shorter distance in a shorter time because the vehicle can travel in the car pool lane designated by a solid line.

Embodiment 1

Figure 1:
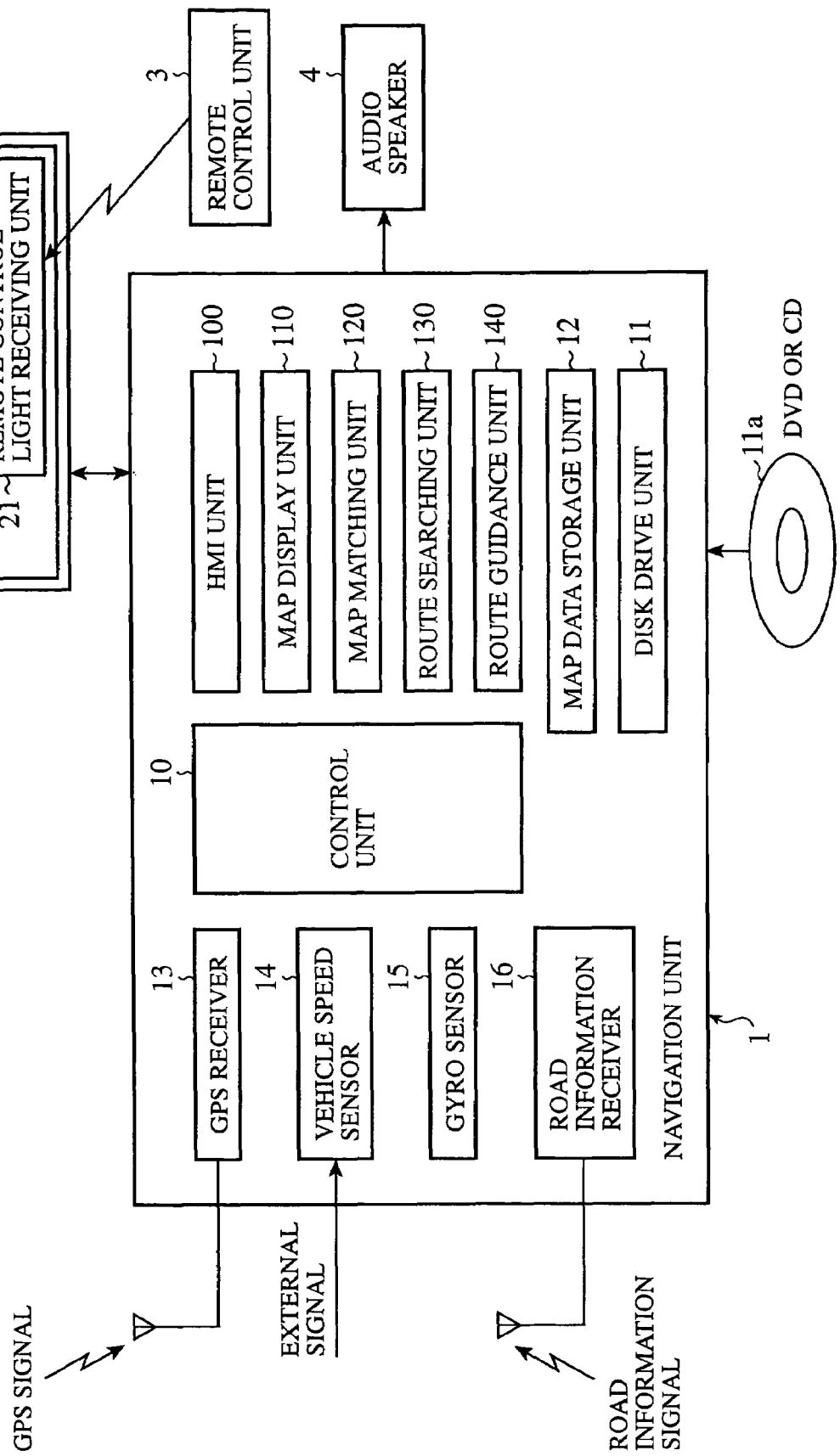
FIG. 1 is a block diagram showing the structure of a route searching apparatus in accordance with each of embodiment 1 and embodiment 2 of the present invention.

FIG. 1 is a block diagram showing the structure of a car navigation apparatus to which a route searching apparatus according to embodiment 1 of the present invention is applied. The car navigation apparatus is provided with a navigation unit 1, a monitor 2 for map display, a remote control unit 3, and an audio speaker 4.

The navigation unit 1 is a kernel of the car navigation apparatus, and performs processings such as display of maps, route searching, and route guidance. The route searching apparatus in accordance with embodiment 1 of the present invention is disposed within the navigation unit 1. The details of this navigation unit 1 will be described later.

The monitor 2 can consist of an LCD, for example, and displays a map, a vehicle position mark indicating the current position of a vehicle in which the car navigation apparatus is mounted, a searched-for and guided route, and other various messages according to a display signal sent thereto from the navigation unit 1. A remote control light receiving unit 21 is disposed in this monitor 2. The remote control light receiving unit 21 receives an optical signal sent thereto from the remote control unit 3, and sends it to the navigation unit 1 by way of the monitor 2. When causing the navigation unit 1 to perform route searching, a user can input a destination and via points, and can respond to a message to urge the user to set a condition of the vehicle, such as an occupancy condition of the vehicle, by using the remote control unit 3.

The audio speaker 4 is used to generate a route guidance voice message based on an audio signal sent thereto from the navigation unit 1.

Next, the details of the navigation unit 1 will be explained. The navigation unit 1 is provided with a control unit 10, a disk drive unit 11, a map data storage unit 12, a GPS receiver 13, a vehicle speed sensor 14, a gyro sensor 15, a human-machine interface unit 100 (abbreviated as "HMI" from here on), a map display unit 110, a map matching unit 120, a route searching unit 130, and a route guidance unit 140. The control unit 10 controls the whole of the navigation unit 1. The control unit 10 can consist of a microcomputer, for example. The HMI unit 100, the map display unit 110, the map matching unit 120, the route searching unit 130, and the route guidance unit 140 can consist of an application program that operates in the microcomputer, and can operate under control of the control unit 10.

The disk drive unit 11 can reproduce the contents recorded in a DVD (Digital Versatile Disc) or CD (Compact Disc) 11a which is inserted thereinto and in which map data are recorded. Map data are defined by nodes and road links including road links corresponding to specific roads, e.g. car pool lanes, on which determination of whether or not the vehicle is allowed to travel is performed according to the condition of the vehicle. The map data reproduced by this disk drive unit 11 is sent to the map data storage unit 12.

The map data storage unit 12 temporarily stores the map data that is sent thereto from the disk drive unit 11. The map data temporarily stored in the map data storage unit 12 is used for map display and route searching described later.

The GPS receiver 13 detects the current position of the vehicle based on GPS signals received from GPS satellites by way of an antenna. Current position data indicating the current position of the vehicle detected by this GPS receiver 13 is sent to the control unit 10.

The vehicle speed sensor 14 detects the speed of the vehicle equipped with this navigation apparatus. Speed data indicating the speed of the vehicle detected by this vehicle speed sensor 14 is sent to the control unit 10. The gyro sensor 15 detects the heading of the vehicle. Heading data indicating the heading of the vehicle detected by this gyro sensor 15 is sent to the control unit 10. The control unit 10 detects the current position of the vehicle by using a self-contained navigation method based on the speed data from the vehicle speed sensor 14 and the heading data from the gyro sensor 15. Because the car navigation apparatus can detect the current position of the vehicle by using the self-contained navigation method even if it cannot detect the current position of the vehicle by using the GPS receiver 13 when the vehicle enters a tunnel or the like, for example, the car navigation apparatus can detect the current position of the vehicle at any time.

A road information receiver 16 can receive a road information signal generated by a road traffic data communication system, for example. The road information signal received by this road information receiver 16 is sent to the control unit 10. The control unit 10 creates a message indicating congestion conditions of roads based on this road information signal, and notifies the message to the user by way of the audio speaker 4.

The HMI unit 100 can process an instruction input via an operation control panel not shown in the figure and an instruction sent thereto from the remote control unit 3 by way of the monitor 2. This HMI unit 100 enables communications between the navigation apparatus and the user.

The map display unit 110 creates drawing data used for displaying a map on the screen of the monitor 2. The drawing data created by this map display unit 110 is sent to the monitor 2, and the map is displayed on the screen of the monitor 2. The map matching unit 120 creates a vehicle position mark indicating the current position of the vehicle based on the current position data from the GPS receiver 13 or the current position data created from the speed data from the vehicle speed sensor 14 and the heading data from the gyro sensor 15, and displays the vehicle position mark on the on-screen map.

The route searching unit 130 searches for an appropriate route to the destination based on the current position of the vehicle. The details of the route searching unit 130 will be described later.

The route guidance unit 140 creates a route guidance message that is to be output when the vehicle moves along the route searched for by the route searching unit 130. This route guidance message is displayed on the screen of the monitor 2, and a corresponding voice message is output from the audio speaker 4.

Figure 2:
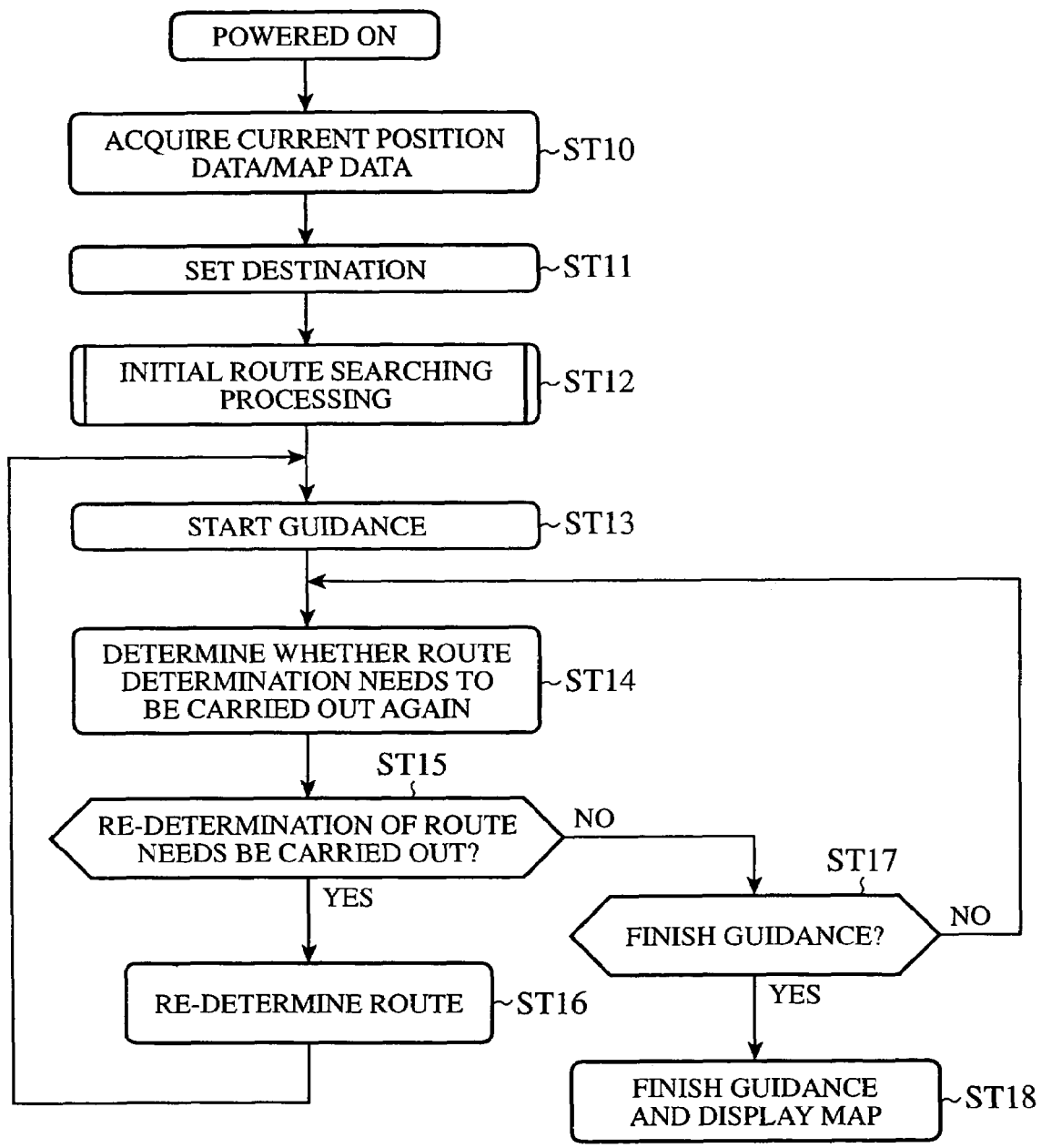
FIG. 2 is a flow chart showing a main process of the route searching apparatus in accordance with each of embodiment 1 and embodiment 2 of the present invention.
Figure 3:
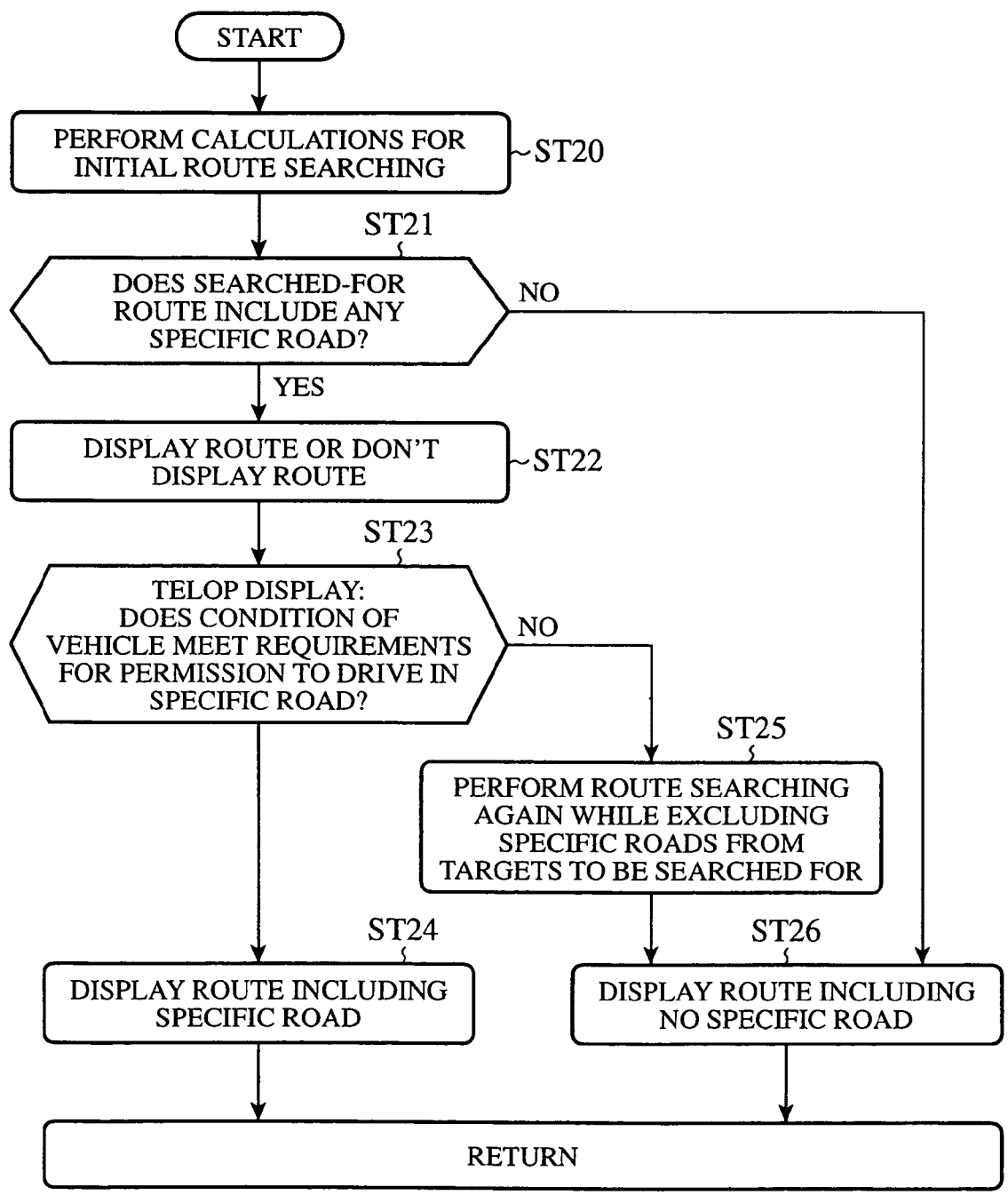
FIG. 3 is a flow chart showing an initial road searching process performed by the route searching apparatus in accordance with embodiment 1 of the present invention.
Figure 4:
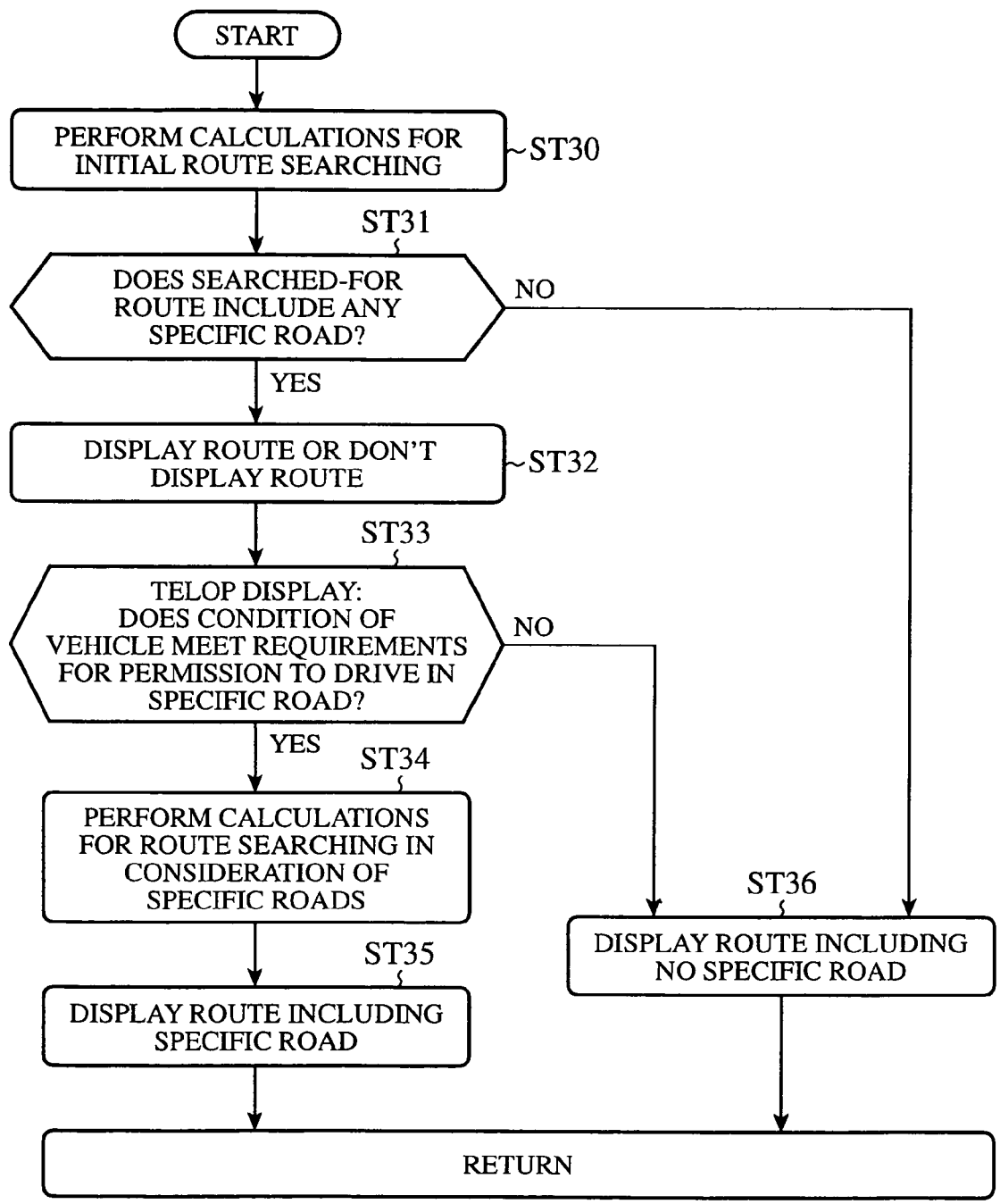
FIG. 4 is a flow chart showing an initial road searching process performed by the route searching apparatus in accordance with embodiment 2 of the present invention.

Next, a description will be made as to an operation of the route searching apparatus in accordance with embodiment 1 of the present invention with reference to flow charts as shown in FIGS. 2 to 4. First of all, a description will be made as to a main process of setting a departure and a destination and performing route searching with reference to the flow chart as shown in FIG. 2.

When the car navigation apparatus is powered on, the car navigation apparatus acquires current position data indicating the current position of the vehicle and map data (in step ST10). In other words, the control unit 10 acquires the current position data from the GPS receiver 13 and sends it to the map matching unit 120. The disk drive unit 11 reads map data from a DVD or CD inserted thereinto and stores it in the map data storage unit 12. The map matching unit 120 reads the map data from the map data storage unit 12 and performs a matching process of superimposing the vehicle position mark on a position specified by the current position data received from the control unit 10. The map data on which this matching processing is performed is sent to the map display unit 110. The map display unit 110 creates drawing data based on the map data from the map matching unit 120, and sends it to the monitor 2. As a result, a map is displayed on the screen of the monitor 2 with the current position of the vehicle being at the center of the map.

Next, the setting of a destination is carried out (in step ST11). In other words, the user can specify a destination on the map displayed on the monitor 2 by using the remote control unit 3. The monitor 2 sends data indicating the destination specified by the user through the remote control unit 3 to the route searching unit 130 of the navigation unit 1.

Next, an initial route searching process is carried out (in step ST1). In this initial route searching process, the route searching unit 130 searches for an appropriate route to the destination while counting road links corresponding to specific roads (e.g., car pool lanes) as targets to be searched for. In other words, the route searching unit 130 searches for a route from the current position identified based on the current position data received from the GPS receiver 13 by way of the control unit 10 to the destination set in step ST11. The route searching unit 130 then sends data indicating the searched-for route to the map display unit 110. As a result, the route from the current position to the destination is displayed on the map displayed on the monitor 2 in a special form. The details of this initial route searching processing will be described later.

When the initial route searching processing is completed, a guidance start process is carried out (in step ST13). In other words, the route guidance unit 140 creates guidance data indicating a guidance message based on the route searched for in step ST12, sends the guidance data to the monitor 2, and creates and sends an audio signal indicating the guidance message to the audio speaker 4. As a result, the guidance message is displayed on the monitor 2, and a corresponding voice message is output from the audio speaker 4. After that, guidance messages corresponding to variations of the environment in which the vehicle is traveling along the route searched for are displayed one by one.

While the guidance on the route is carried out, the navigation apparatus carries out a process of determining whether the determination of the route needs to be carried out again (in step ST14). Concretely, the navigation apparatus examines whether the vehicle goes off the route searched for. Then, when determining that the vehicle goes off the route, the navigation apparatus delivers a message to inquire whether to perform route searching again to the monitor 2 so as to seek the user's determination (in step ST15). When the user makes an instruction for performing route searching again by using the remote control unit 3 after changing a searching condition if necessary, the navigation apparatus carries out the determination of the route again (in step ST16). After that, the navigation apparatus returns the sequence to step ST13, and then performs a guidance start process of staring guidance on the route that is determined again.

When the user makes an instruction for not performing route searching again, in step ST15, the navigation apparatus outputs a message to inquire whether to finish the guidance to the monitor 2 so as to seek the user's determination (in step ST17). Then, when the user inputs an instruction for not finishing the guidance by using the remote control unit 3, the navigation apparatus returns the sequence returns to step ST14 and then performs the process of determining whether the determination of the route needs to be carried out again.

On the other hand, when the user makes an instruction for finishing the guidance, in step ST17, the navigation apparatus stops the output of guidance messages and, after that, carries out only the display of the map on the monitor 2.

In above-mentioned step ST15, the navigation apparatus is so constructed as to seek the user's determination of whether to perform route searching again. As an alternative, when determining that the vehicle goes off the route searched for, the navigation apparatus can automatically perform calculations for route searching again (rerouting). In this case, the navigation apparatus cannot change the already-set searching condition.

Next, the details of the initial route searching processing that is carried out in above-mentioned step ST12 will be explained with reference to the flow chart as shown in FIG. 3.

In the initial route searching processing, the navigation apparatus performs calculations for initial route searching first (in step ST20). In the process of this step ST20, the navigation apparatus performs route searching while counting road links corresponding to specific roads (e.g., car pool lanes), on which the determination of whether or not the vehicle is allowed to travel is carried out according to the occupancy condition of the vehicle, as targets to be searched for. The navigation apparatus then determines whether the searched-for route includes one or more specific roads (in step ST21). In this step ST21, when determining that the searched-for route includes one or more specific roads, the navigation apparatus outputs a message to urge the user to determine whether the occupancy condition of the vehicle meets requirements for permission to drive in the one or more specific roads, i.e., to check to see whether two or more occupants are riding together in the vehicle (i.e., whether or not the vehicle is a high occupancy vehicle) to the monitor 2 as a telop, so as to seek the user's determination (in step ST23), after displaying the route on the monitor 2 or without displaying the route (in step ST22).

When the user determines that the occupancy condition of the vehicle meets requirements for permission to drive in the one or more specific roads through an input operation using the remote control unit 3, in step ST23, the navigation apparatus displays the route including the one or more specific roads, which is searched for in step ST20, on the screen of the monitor (in step ST24). When the route has already been displayed on the monitor 2, in step ST22, the navigation apparatus omits the process of this step ST24. After that, the navigation apparatus returns the sequence to the guidance start processing (in step ST13) as shown in FIG. 2.

On the other hand, when the user determines that the occupancy condition of the vehicle doesn't meet requirements for permission to drive in the one or more specific roads through an input operation using the remote control unit 3, in step ST23, the navigation apparatus performs calculations for route searching while excluding the one or more specific roads from targets to be searched for, i.e., excluding road links corresponding to the one or more specific roads from targets to be searched for (in step ST25). The navigation apparatus then displays the route that doesn't include the one or more specific roads acquired in step ST25 (in step ST26). After that, the navigation apparatus returns the sequence to the guidance start process (in step ST13) as shown in FIG. 2.

In above-mentioned step ST21, when determining that the route searched for in step ST20 includes no specific road, the navigation apparatus branches the sequence to step ST26, and displays the route including no specific road on the screen of the monitor 2.

As previously explained, the route searching apparatus in accordance with embodiment 1 of the present invention searches for an appropriate route to a destination while counting road links corresponding to specific roads as targets to be searched for before a condition of the vehicle is set, i.e., without a user's setting of the condition of the vehicle, and, after that, when determining that one or more specific roads are included in the searched-for route, outputs a message to urge the user to determine whether the condition of the vehicle meets requirements for permission to drive in the one or more specific roads. Therefore, because the user need not carry out the setting of the condition of the vehicle in advance, and only has to set the condition of the vehicle according to a message provided after the route searching, the navigation apparatus can perform the route searching by taking the condition of the vehicle into consideration in response to a simple operation done by the user.

A variant can be made in above-mentioned embodiment 1 as follows. In accordance with this variant, the navigation unit 1 has a detecting unit (not shown in the figures) for detecting that the vehicle reaches a predetermined region of a specific road, and the route searching unit 130 starts the route searching processing from above-mentioned step ST13 when the detecting unit detects that the vehicle reaches a predetermined region of a specific road. When determining that the distance between the position of a road link corresponding to the specific road and the current position of the vehicle is shorter than a predetermined value by calculating the distance on the map, the detecting unit can detect that the vehicle reaches a predetermined region of the specific road.

In addition, when detecting that the vehicle reaches a predetermined region of a specific road, the navigation apparatus outputs a message to urge the user to determine whether the condition of the vehicle meets requirements for permission to drive in the specific road, i.e., to check to see whether two or more occupants are riding together in the vehicle to the monitor 2 as a telop. Therefore, when the occupancy condition of the vehicle changes (e.g., when one or more occupants get off as the vehicle travels along the route and only the driver is riding or when one or more occupants get on as the vehicle travels along the route and two or more occupants are riding together), the navigation apparatus can search for the route again under a new occupancy condition of the vehicle. As a result, the navigation apparatus enables the user to always drive the vehicle along the route under the most advantageous conditions. Furthermore, because the user only has to set the occupancy condition of the vehicle in response to the message even in this case, the user can obviate the inconvenience of setting the occupancy condition of the vehicle. In addition, when any specific road doesn't exist in the route, the user need not perform a useless setting operation because any message is not displayed on the monitor.

Furthermore, in accordance with embodiment 1 mentioned above, the navigation apparatus performs route searching first while counting road links corresponding to specific roads as targets to be searched for (in step ST20), and, when the user determines that the occupancy condition of the vehicle doesn't meet requirements for permission to drive in specific roads, performs route searching while excluding road links corresponding to specific roads from targets to be searched for (in step ST25). As an alternative, the navigation apparatus can perform route searching while counting road links corresponding to specific roads as targets to be searched for and also perform route searching while excluding road links corresponding to specific roads from targets to be searched for, and can use either one of two route searching results when needed.

Embodiment 2

A route searching apparatus in accordance with embodiment 2 of the present invention differs from that in accordance with embodiment 1 in that the route searching apparatus of embodiment 2 performs calculations for initial route searching while excluding road links corresponding to specific roads (e.g., car pool lanes) from targets to be searched for.

The route searching apparatus in accordance with embodiment 2 has the same structure as that in accordance with embodiment 1, as shown in FIG. 1, and the route searching apparatus in accordance with embodiment 2 carries out the same main processing as that as shown in FIG. 2, which is performed by the route searching apparatus in accordance with embodiment 1. Only initial route searching processing carried out by the route searching apparatus in accordance with embodiment 2 is different from that carried out by the route searching apparatus in accordance with embodiment 1. Hereafter, only the initial route searching processing will be explained with reference to a flow chart as shown in FIG. 4.

In the initial route searching processing, the navigation apparatus performs calculations for initial route searching first (in step ST30). In the process of this step ST30, the navigation apparatus performs route searching while excluding road links corresponding to specific roads (e.g., car pool lanes) from targets to be searched for, and determines whether one or more road links corresponding to specific roads exist in the searched-for route. The navigation apparatus then determines whether one or more specific roads exist in the searched-for route (in step ST31). In this step ST31, when determining that the searched-for route includes one or more specific roads, the navigation apparatus outputs a message to urge the user to determine whether an occupancy condition of the vehicle meets requirements for permission to drive in the one or more specific roads, i.e., to check to see whether two or more occupants are riding together in the vehicle to a monitor 2 as a telop, so as to seek the user's determination (in step ST33), after displaying the route on the screen of the monitor 2 or without displaying the route (in step ST32).

When the user determines that the occupancy condition of the vehicle meets requirements for permission to drive in the one or more specific roads through an input operation using a remote control unit 3, in step ST33, the navigation apparatus performs calculations for route searching while counting the one or more specific roads as targets to be searched for, i.e., counting road links corresponding to the one or more specific roads as targets to be searched for (in step ST34). The navigation apparatus then displays the route including the one or more specific roads acquired in step ST34 (in step ST35). After that, the navigation apparatus returns the sequence to a guidance start processing (in step ST13) as shown in FIG. 2.

On the other hand, when the user determines that the occupancy condition of the vehicle doesn't meet requirements for permission to drive in the one or more specific roads through an input operation using the remote control unit 3, in step ST33, the navigation apparatus displays the route that doesn't include the one or more specific roads, which is searched for in step ST30, on the screen of the monitor (in step ST36). When the route has already been displayed on the monitor 2, in step ST32, the navigation apparatus omits the process of this step ST36. After that, the navigation apparatus returns the sequence to the guidance start processing (in step ST13) as shown in FIG. 2.

In above-mentioned step ST31, when determining that the route searched for in step ST30 includes no specific road, the navigation apparatus branches the sequence to step ST36, and displays the route including no specific road on the screen of the monitor 2.

As previously explained, the route searching apparatus in accordance with embodiment 2 of the present invention searches for an appropriate route to a destination while excluding road links corresponding to specific roads from targets to be searched for before a condition of a vehicle is set, i.e., without a user's setting of the condition of the vehicle, and, after that, when determining that one or more specific roads are included in the searched-for route, outputs a message to urge the user to determine whether the condition of the vehicle meets requirements for permission to drive in the one or more specific roads. Therefore, because the user need not carry out the setting of the condition of the vehicle in advance, and only has to set the condition of the vehicle according to a message provided after the route searching, the navigation apparatus can perform the route searching by taking the condition of the vehicle into consideration in response to a simple operation done by the user.

A variant can be made in above-mentioned embodiment 2 as follows. In accordance with this variant, the navigation unit 1 has a detecting unit (not shown in the figure) for detecting that the vehicle reaches a predetermined region of a specific road, and a route searching unit 130 starts the route searching processing from above-mentioned step ST33 when the detecting unit detects that the vehicle reaches a predetermined region of a specific road. In addition, when detecting that the vehicle reaches a predetermined region of a specific road, the navigation apparatus outputs a message to urge the user to determine whether the occupancy condition of the vehicle meets requirements for permission to drive in the specific road, i.e., to check to see whether two or more occupants are riding together in the vehicle to the monitor 2 as a telop. Therefore, when the condition of the vehicle changes (e.g., when one or more occupants get off as the vehicle travels along the route and only the driver is riding or when one or more occupants get on as the vehicle travels along the route and two or more occupants are riding together), the navigation apparatus can search for the route again under a new occupancy condition of the vehicle. As a result, the navigation apparatus enables the user to always drive the vehicle along the route under the most advantageous conditions. Furthermore, because the user only has to set the occupancy condition of the vehicle in response to the message even in this case, the user can obviate the inconvenience of setting the condition of the vehicle in advance. In addition, when any specific road doesn't exist in the route, the user need not perform a useless setting operation because no message is displayed on the monitor.

Furthermore, in accordance with embodiment 2 mentioned above, the navigation apparatus performs route searching first while excluding road links corresponding to specific roads from targets to be searched for (in step ST30), and, when the user determines that the condition of the vehicle doesn't meet requirements for permission to drive in specific roads, performs route searching while counting road links corresponding to specific roads as targets to be searched for (in step ST34). As an alternative, the navigation apparatus can perform route searching while counting road links corresponding to specific roads as targets to be searched for and also perform route searching while excluding road links corresponding to specific roads from targets to be searched for, and can use either one of two route searching results when needed.

In above-mentioned embodiments 1 and 2, an explanation is made by taking car pool lanes which part of road systems in the United States employ and in which vehicles are limitedly allowed to travel according to the occupancy conditions of the vehicles, i.e., the number of occupants in each of the vehicles, as an example of specific roads. In accordance with the present invention, specific roads are not limited to car pool lanes in which vehicles are limitedly allowed to travel according to the occupancy conditions of the vehicles, i.e., the number of occupants in each of the vehicles, and can be roads in where vehicles are limitedly allowed to travel according to such a condition of each of the vehicles as "Attribute of vehicle", "Type or performance of engine installed in vehicle", "Size or weight of vehicle", "Type of vehicle", "License number of vehicle", or "With or without license to drive in specific road".

Many widely different embodiments of the present invention may be constructed without departing from the spirit and scope of the present invention. It should be understood that the present invention is not limited to the specific embodiments described in the specification, except as defined in the appended claims.

What is claimed is:

1. A route searching apparatus comprising:
a map data acquiring unit for acquiring map data defined by nodes and road links;
a route searching unit for searching for and determining a route to a destination in consideration of road links corresponding to specific roads including car pool lanes, on which determination of whether or not a vehicle is allowed to travel can be performed according to a condition of the vehicle, the route searching unit prompting a driver of the vehicle of the condition of the vehicle including the number of people in the vehicle prior to displaying the determined route, the user setting the condition of the vehicle, and the route searching unit displaying the determined route or performing a new route search and determined based on the conditions set, the road links being included in the map data acquired by said map data acquiring unit; and
an output unit for outputting the route searched for by said route searching unit to a display,
wherein said route searching unit searches for the route to the destination while counting road links corresponding to specific roads included in the map data acquired by said map data acquiring unit as targets to be searched for, when the condition of the vehicle that is input thereto in response to the message meets requirements for permission to drive in the specific road, said route searching unit sends the route acquired through the route searching to said output unit for display, whereas when the condition of the vehicle that is input thereto in response to the message doesn't meet the requirements for permission to drive in the specific road, said route searching unit performs a new search for the route to the destination by excluding a road link corresponding to the specific road from targets to be searched for and outputs the searched-for route to said output unit for display.

2. A route searching apparatus comprising:
a map data acquiring unit for acquiring map data defined by nodes and road links;
a route searching unit for searching for and determining a route to a destination in consideration of road links corresponding to specific roads including car pool lanes, on which determination of whether or not a vehicle is allowed to travel can be performed according to a condition of the vehicle, the route searching unit prompting a driver of the vehicle of the condition of the vehicle including the number of people in the vehicle prior to displaying the determined route, the user setting the condition of the vehicle, and the route searching unit displaying the determined route or performing a new route search and determination based on the condition set, the road links being included in the map data acquired by said map data acquiring unit; and
an output unit for outputting the route searched for by said route searching unit to a display,
wherein said route searching unit searches for the route to the destination by excluding the road links included in the map data acquired by said map data acquiring unit and corresponding to the specific roads from targets to be searched for, when the condition of the vehicle that is input thereto in response to the message doesn't meet requirements for permission to drive in the specific road, said route searching unit delivers the route acquired through the route searching to said output unit for display, whereas when the condition for the vehicle that is received in response to the message meets the requirements for permission to drive in the specific road, said route searching unit performs a new search for the route to the destination while counting a road link corresponding to the specific road as targets to be searched for and outputs the search-for route to send output unit for display.

* * * * *